United States Patent [19]

Bullivant-Clark

[11] Patent Number: 4,975,334
[45] Date of Patent: Dec. 4, 1990

[54] COMPOSITE PANEL

[75] Inventor: Peter M. Bullivant-Clark, High Wycombe, England

[73] Assignee: British Alcan Aluminium PLC, Buckinghamshire, England

[21] Appl. No.: 469,512

[22] PCT Filed: Jul. 20, 1988

[86] PCT No.: PCT/GB88/00589
§ 371 Date: Mar. 12, 1990
§ 102(e) Date: Mar. 12, 1990

[87] PCT Pub. No.: WO89/00897
PCT Pub. Date: Feb. 9, 1989

[30] Foreign Application Priority Data

Jul. 23, 1987 [GB] United Kingdom ............... 8717442

[51] Int. Cl.$^5$ .................. E04C 2/32; B21D 13/08; B21D 13/10
[52] U.S. Cl. .................. 428/593; 428/597; 428/603; 52/799; 29/469.5; 29/163.6; 72/185; 156/205; 156/211
[58] Field of Search .................. 428/593, 597, 603; 29/163.6, 469.5, 455.1; 72/185, 186; 156/205, 207, 211; 52/799, 806, 807, 808

[56] References Cited

U.S. PATENT DOCUMENTS

| 1,296,272 | 3/1919 | Doble | 29/163.6 |
| 3,017,971 | 1/1962 | Christman | 52/806 |
| 3,018,209 | 1/1962 | Dijrsberhuis et al. | 156/211 |
| 3,112,532 | 12/1963 | Slowinski | 52/799 |
| 3,158,527 | 11/1964 | Faccin et al. | 156/207 |
| 3,162,567 | 12/1964 | Heller | 428/597 |
| 3,162,942 | 12/1964 | Christman | 72/185 |
| 3,226,905 | 1/1966 | Richardson et al. | 52/806 |
| 3,279,043 | 10/1966 | Wirt | 29/163.6 |
| 3,376,684 | 4/1968 | Cole et al. | 52/799 |
| 3,623,936 | 11/1971 | Hotz | 52/806 |
| 3,676,267 | 7/1972 | Fairbanks | 29/163.6 |
| 4,068,366 | 1/1976 | Hillesheim | 29/163.6 |
| 4,497,751 | 2/1985 | Pluss | 29/163.6 |

FOREIGN PATENT DOCUMENTS

| 1024889 | 4/1953 | France . | |
| 1399422 | 5/1988 | U.S.S.R. | 52/806 |

Primary Examiner—John J. Zimmerman
Attorney, Agent, or Firm—Browdy and Neimark

[57] ABSTRACT

A continuous process for making a core for a composite panel comprising cutting spaced apart tongues in columns from a metallic sheet, the tongues being foldable about base lines in the columns each base line being separated from the next tongue in the column by a web; folding the sheet to form a castellated structure having continuous side walls constituted by the spaces between adjacent columns of tongues with the webs of adjoining rows respectively lying in spaced apart parallel planes and oppositely folding the tongues of adjoining columns to lie alongside adjacent side walls with their extremities remote from their base lines extending in an appropriate one of the planes. The invention also includes a composite panel comprising the core covered on each side with sheet material as well as a process for making such a panel.

11 Claims, 2 Drawing Sheets

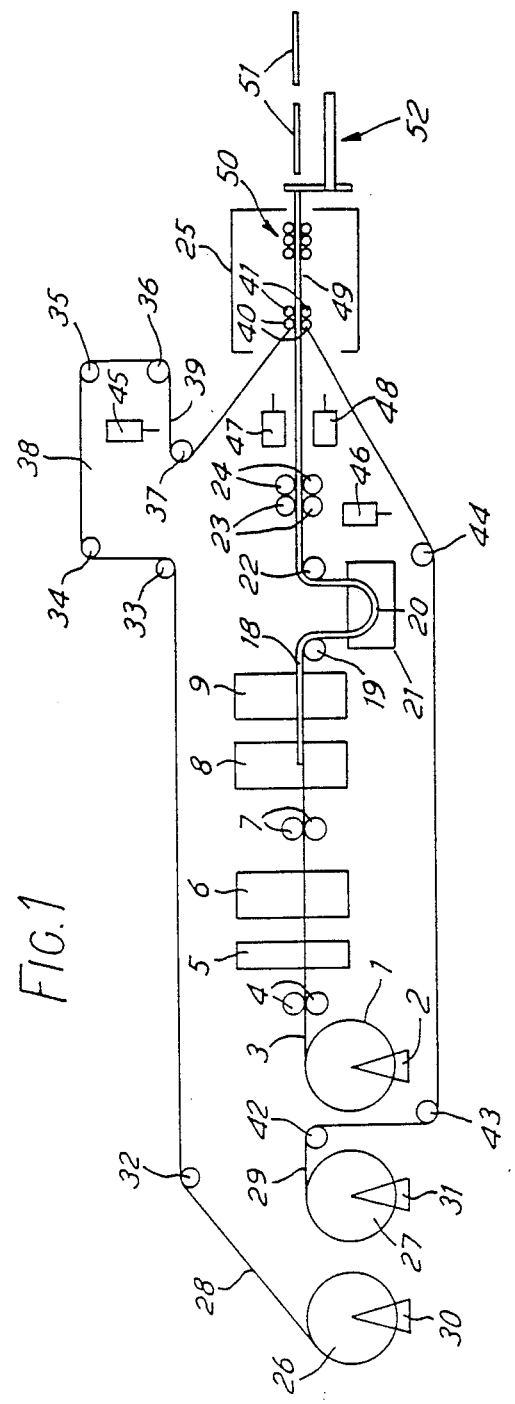

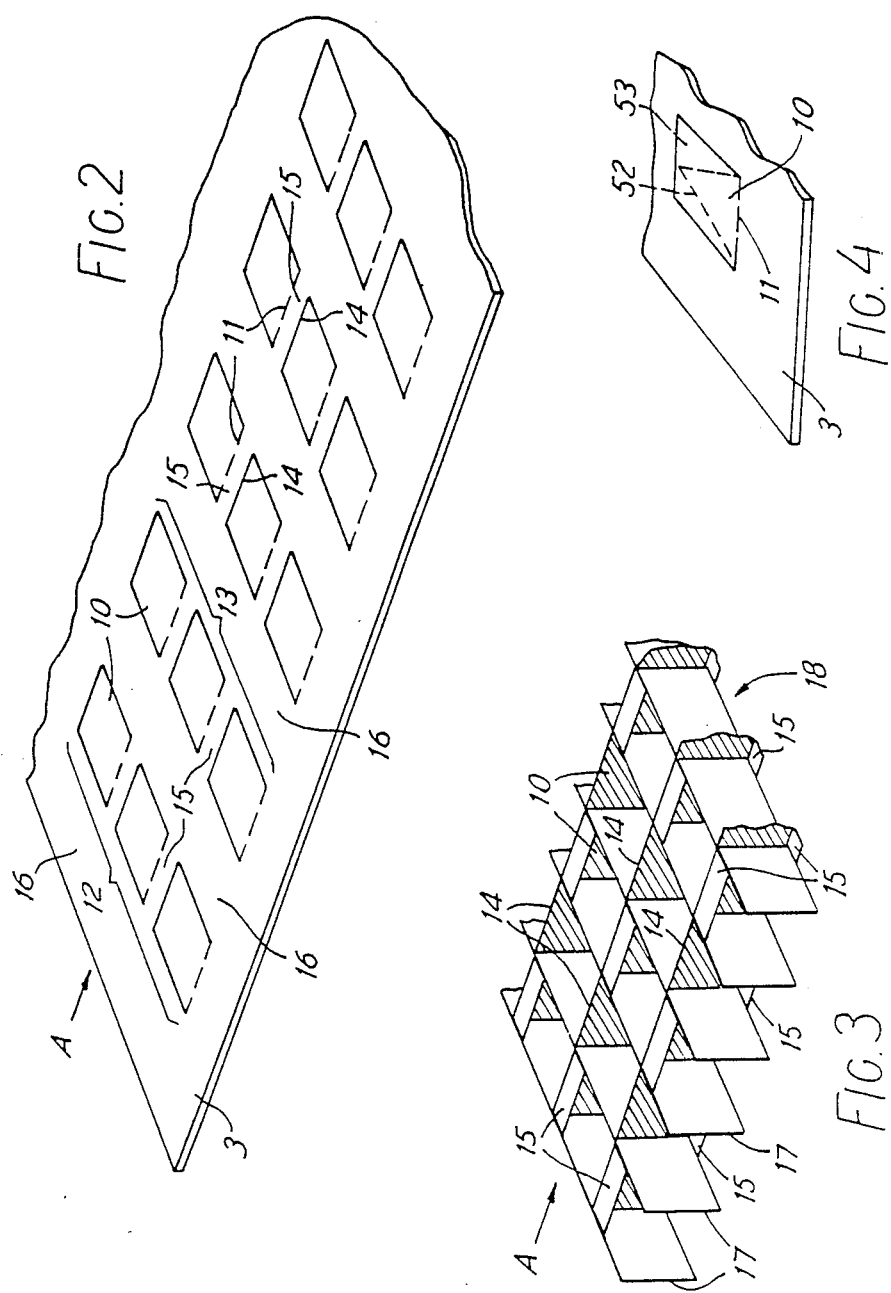

COMPOSITE PANEL

FIELD OF THE INVENTION

This invention relates to a method of making the metallic core of a composite panel; to a method of making the panel and to a panel using the core.

DESCRIPTION OF THE PRIOR ART

In the past it has been usual in the manufacture of composite panels having metallic non-solid cores for both the cores and the resultant panels to be manufactured in batches. Although many kinds of non-solid cores have been used there has been a tendency to favour honeycomb structures as presenting good strength characteristics but these require batch production methods to be used. Both batch production and the use of cores of honeycomb formation are expensive and there is a significant market for cheaper panels having lesser strength characteristics.

SUMMARY OF THE INVENTION

It is therefore an object of the present invention to provide an improved method of making a metallic core for a composite panel which can be produced from coiled sheet material in a continuous process, an improved method of making the panel incorporating the core and an improved panel.

According to one aspect of the present invention there is provided a continuous process for making a core for a composite panel comprising cutting spaced apart tongues in columns from a metallic sheet characterised in that the tongues are foldable about base lines in the columns each base line being separated from the next tongue in the column by a web; folding the sheet to form a castellated structure having continuous side walls constituted by the spaces between adjacent columns of tongues with the webs of adjoining rows respectively lying in spaced apart parallel planes and oppositely folding the tongues of adjoining columns to lie alongside adjacent side walls with their extremities remote from their base lines extending in an appropriate one of the planes.

Another aspect of the invention provides a process for making a composite panel in which a core formed according to the preceding paragraph is passed continuously through profile compression means which closes the side walls closely against the tongues and in which after said means, sheet material from second and third coils is passed respectively on each side of the core and stuck thereto.

The invention also provides a composite panel comprising a core having spaced apart tongues arranged in columns in a metallic sheet characterised in that the tongues are folded about base lines in the columns each base line being separated from the next tongue in the column by a web; the sheet being castellated having continuous side walls constituted by the spaces between adjacent columns of tongues with the webs of adjoining rows respectively lying in spaced apart parallel planes and the tongues of adjoining columns lying alongside adjacent side walls with their extremities remote from their base lines extending in an appropriate one of the planes and the core being covered on each side with sheet material stuck thereto.

BRIEF DESCRIPTION OF THE DRAWINGS

The above and other aspects of the invention will now be described by way of example with reference to the accompanying drawing in which:

FIG. 1 is a diagrammatic view of a machine for continuous production of a core and a composite panel, FIG. 2 is a third angle projection of part of a sheet to form a core, FIG. 3 is a similar view of a core folded from the sheet of FIG. 2 with the tongues cross-hatched for clarity, and FIG. 4 is a fragmentary view of part of a sheet with a modified tongue shape.

DESCRIPTION OF THE PREFERRED EMBODIMENTS

Referring first to FIG. 1 this shows a machine for making a core and composite panel according to the present invention. The machine is arranged for in line intermittent and continuous operation and comprises a first coil 1 of aluminium alloy mounted on a decoiler 2, sheet 3 from the coil 1 is fed through rollers 4 and successively through an oiler 5 and a shearing station 6 of known type. The sheet 3 then passes through further guide rolls 7 to a known castellation former 8 and a known bending station 9. Because of the nature of shearing, castellation forming and bending it will be understood that the operation of the machine so far described is intermittent.

Turning now to FIG. 2 this shows the sheet 3 after passing through the shearing station 6 and having been slit to form tongues 10 each foldable about a notional base line 11. The tongues are in spaced apart columns such as 12 and 13 extending transversely to the direction of movement "A" of the sheet 3. The base line 11 about which each tongue can be folded is separated from the end extremity 14 of its adjacent tongue by a web 15 and it will be appreciated that with the arrangement of FIG. 2 the webs 15 of adjoining columns are in alignment. Each column such as 12 and 13 is separated by a space 16.

Having passed through the shearing station 6 for slitting the sheet 3 is then repeatedly folded in the castellation former 8 to form the castellated profile of FIG. 3 the folds being along the slit sides of the tongues 10. The tongues 10 of each column such as 12, 13 are now folded up and down such that they close the ends of the castellated profile. The tolerance of the slitting and folding operations are such that the side edges of the tongues 10 contact the continuous side walls 17 of the core which are themselves formed by the spaces 16 of the sheet 3.

It will be seen from FIG. 3 that the webs 15 of adjoining columns of tongues 10 such as 12 and 13 in FIG. 1 now respectively lie in spaced apart parallel planes represented by the width of the side walls 17 which now constitute the width of the core structure and the extremities 14 of the tongues extend in the plane of one set of the webs 15.

Reverting now to FIG. 1 when the castellated core, now indicated at 18, leaves the bending station 9 it passes downwardly over a guide roll 19 to be looped at 20 through a degreasing bath 21. From the bath the core passes over a guide roll 22 and through a set of profile compression rolls 23, 24 into a heating chamber 25. It will here be understood that the loop 20 can vary in size to accommodate the intermittent movement of the core 18 leaving the bending station 9 and continuous movement through the rolls 23, 24. It will also be understood that the profile of the core 18 readily allows it to bend around an axis at right angles to its direction of travel.

The rolls 24 are arranged to rotate more slowly than the rolls 23 so that "bunching" of the castellated core 18 takes place. This is desirable for subsequent formation of a composite panel since both the natural spring in the sheet material and the bending through the degreaser 21 cause the edges of the tongues 10 to move away from the walls 17. From the rolls 24 the bunched core passes into the chamber 25.

Second and third coils 26 and 27 of sheet material 28 and 29 are disposed on decoilers 30 and 31. The sheet material may be of plastics but will usually be metallic and of aluminium alloy. The sheet 28 passes over a guide roll 32 and then over a succession of rolls 33, 34, 35, 36 and 37 creating a "box" 38 so that the final strand 39 of the sheet 28 extends horizontally with its inner surface uppermost. From the roll 37 the sheet 28 passes into the heating chamber 25 and is applied to the upper surface of the core 18 at rolls 40, 41. The sheet 29 passes over guide rolls 42, 43 and 44 and then into the heating chamber 25 and is applied to the lower surface of the core 18 at the rolls 40, 41.

Adhesive applicators 45 and 46 are respectively located within the box 38 and on the inner side of the sheet 29 after the roll 44. These applicators drip feed adhesive on to the inner surfaces of both sheets. The preferred adhesive is a water foaming polyurethane which is held in the applicators under an inert atmosphere such as nitrogen. Water jets 47 and 48 apply a fine spray to the adhesive coating just prior to the joining of the sheets 28 and 29 with the core 18 at the rolls 40, 41 so as to promote foaming of the adhesive. Foaming enables the adhesive to spread between the walls 17 of the core 18 so as to engage the side edges of the tongues 10 as well as around the outer edges 14 of the tongues and over the edges of the webs 15. The composite panel 49 thus formed in the heating chamber 25 passes through pinch rolls indicated generally at 50 to consolidate close contact between the core 18 and the sheets 28 and 29. Beyond the chamber 25 the panel 49 is cut into sections 51 by a flying saw 52.

By using a polyurethane adhesive the temperature within the chamber 25 may be maintained at 50° C. to 80° C. which enables the sheets 28 and 29 to be prepainted on their outer surface without the paint finish being damaged within the chamber 25.

Although the composite panel 49 is preferably formed as described above it will be understood that the continuously formed core 18 could be cut into sections and panels made by batch production techniques. In such case the necessary bunching of the core can be performed in a suitable jig (not shown). Such batch production method is essential for the formation of curved panels using precurved covering sheets. It would also be possible to stick only one of the sheets 28 or 29 to the core 18 in the machine of FIG. 1; subsequently bend the partly formed panel in a jig and then apply the other panel.

It is envisaged that panel sections 51 produced in aluminium alloy in the machine of FIG. 1 could have a width up to 1600 mm a maximum length of 12 meters. The coils 1, 26 and 27 could be up to 10 tonnes. It is expected that the panels would have a flatness within a tolerance of 0.4 mm per meter length.

The results indicate that the performance of the panel is only slightly inferior to that of the honeycomb product when used with the same epoxy adhesive. The choice of the polyurethane adhesive is dictated by cost, by the ease of using the system within an automated line and it has been found to provide a panel of adequate strength.

Once the panel sections 51 have been cut it will be understood that in separate operations various edge closing methods may be employed. These include bending and crimping or sticking excess material of the sheets 28 and 29; incorporating a separate metallic edging member and plugging the edges with a plastics filler.

When the panels are of aluminium alloy it is expected that they will have a total thickness of 10 mm to 25 mm.

Although as described above the tongues 10 are rectangular it will be understood that their side edges could be inclined towards one another so that the walls 17 are also inclined. FIG. 4 of the drawings illustrates the limit of this possibility with the tongues 10 being triangular, as at 52. In this case opposed walls 17 would adjoin at the apex of the triangles to provide hollow triangular beams extending transverse to the arrows 'A'. The excess material 53 could be punched out and wasted or bent to be stuck to the walls 17.

The resultant panel is not as strong as panels having a conventional honeycombed core but nevertheless has a multitude of uses where high strength is not so important, in view of the economy that can be provided by continuous production.

The strength of the core shown in FIG. 3 could also be increased for example by staggering the tongues 10 in each column in the sheet 3 so that the webs 15 are not in alignment with one another on opposite sides of the core. Another modification could be to increase the spacing of the tongues in the columns so that they are long enough for their extremities 14 to be folded over to lie in the planes of the appropriate webs 15.

I claim:

1. A continuous process for making a core for a composite panel comprising cutting spaced apart tongues in columns from a metallic sheet characterised in that the tongues are foldable about base lines in the columns each base line being separated from the next tongue in the column by a web; folding the sheet to form a castellated structure having continuous side walls constituted by the spaces between adjacent columns of tongues with the webs of adjoining rows respectively lying in spaced apart parallel planes and oppositely folding the tongues of adjoining columns to lie alongside adjacent side walls with their extremities remote from their base lines extending in an appropriate one of the planes.

2. A process according to claim 1 in which facing sheets are secured to the formed core in the same continuous process to form a composite panel.

3. A process according to claim 1 in which metal sheet from a first coil is passed intermittently successively through a slitting mechanism for forming the tongues in the plane of the sheet; a castellation former and a tag bender.

4. A process for making a composite panel in which a core formed according to claim 1 is passed continuously through profile compression means which closes the side walls tightly against the tongues and in which after said means, sheet material from second and third coils is passed respectively on each side of the core and stuck thereto.

5. A process according to claim 4 in which the core and said sheet material is passed through a heated chamber containing pinch rolls for the panel which, in conjunction with the profile compression means, maintains the core with its side walls closed tightly against the tongues.

6. A process according to claim 5 in which each sheet material has its outer surface pre-painted and the inner surface is coated with an adhesive before passing through the chamber and the temperature of the latter is sufficiently high to cause the adhesive to set but sufficiently low that the pre-painted surfaces are not damaged.

7. A process according to claim 6 in which the temperature is between 50° C. and 80° C.

8. A process according to claim 7 in which the adhesive has a polyurethane base.

9. A composite panel comprising a core having spaced apart tongues arranged in columns in a metallic sheet characterised in that the tongues are folded about base lines in the columns each base line being separated from the next tongue in the column by a web; the sheet being castellated having continuous side walls constituted by the spaces between adjacent columns of tongues with the webs of adjoining rows respectively lying in spaced apart parallel planes and the tongues of adjoining columns lying alongside adjacent side walls with their extremities remote from their base lines extending in an appropriate one of the planes and the core being covered on each side with sheet material stuck thereto.

10. A composite panel according to claim 9 in which sheets are metallic and their outer surfaces are pre-painted.

11. A composite panel according to claim 9 in which the core and the outer sheets are of aluminium alloy.

* * * * *